(12) United States Patent
Liedmeyer et al.

(10) Patent No.: US 7,445,266 B2
(45) Date of Patent: Nov. 4, 2008

(54) CABRIOLET VEHICLE

(75) Inventors: Petra Liedmeyer, Recke (DE); Sven Hollenbeck, Westerkappeln (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/577,081

(22) PCT Filed: Oct. 21, 2004

(86) PCT No.: PCT/DE2004/002344

§ 371 (c)(1),
(2), (4) Date: Jan. 16, 2007

(87) PCT Pub. No.: WO2005/039907

PCT Pub. Date: May 6, 2005

(65) Prior Publication Data

US 2007/0205637 A1  Sep. 6, 2007

(30) Foreign Application Priority Data

Oct. 24, 2003  (DE) .................. 103 49 819

(51) Int. Cl.
*B60J 7/12* (2006.01)
(52) U.S. Cl. .................. 296/124; 296/107.12
(58) Field of Classification Search ............ 296/107.12, 296/124, 125, 126
See application file for complete search history.

(56) References Cited

U.S. PATENT DOCUMENTS

2001/0030443 A1  10/2001  Barker

FOREIGN PATENT DOCUMENTS

DE  196 16 255  5/1997
DE  100 29 478  1/2002

*Primary Examiner*—Joseph D Pape
(74) *Attorney, Agent, or Firm*—Friedrich Kueffner

(57) ABSTRACT

The invention relates to a cabriolet vehicle (1), with a roof (2), comprising a flexible cover (3), at least in the rear part thereof, whereby the cover (3) may be held in tension against the chassis (7), by means of a tension stay (11) and the tension stay (11) rests on one or several supports (15) in the open position, embodied such that the support(s) (15) are fixed on one or more bracket(s) (14), connected to a roof frame (5), attached below the cover (3), before assembly thereof on the chassis (7).

9 Claims, 6 Drawing Sheets

CABRIOLET VEHICLE

BACKGROUND OF THE INVENTION

1. Field of the Invention

The invention concerns a convertible vehicle with a roof that has a flexible roof covering at least in its rear area, wherein the flexible roof covering is movable between an open position and a closed state, wherein the roof covering can be held under tension relative to the automobile body by at least one tension bow, and, wherein, in the open position, the tension bow rests on one or more supports. The invention also relates to a movable vehicle roof.

2. Description of the Related Art

Many convertible vehicles are known which have a metal roof frame that supports a roof covering, the rear region of which is held from below by a tension bow. A representative of this general class of vehicles is the current Audi convertible based on the Audi A4. When the roof of this vehicle is closed, the tension bow rests on a part of the automobile body—in this case a movable cover part—and stretches the roof covering, the front end of which can be held on a rigid roof tip. A roof of this type must be properly aligned when it is mounted in the bodyshell. For this reason, adjustable supports, on which the tension bow rests in the open position of the roof, are provided in the bodyshell, e.g., in the area of the rear wheel house. The adjustment of the supports must be performed very precisely both to prevent the tension bow from rubbing parts of the folding-top compartment as it is being lowered, since this could damage the folding-top compartment and/or the tension bow itself, and to achieve optimized folding of the roof covering. A final position of the tension bow that is too high would result in the roof covering being too tightly folded in the open position of the mounted roof, so that kinks would be formed in the roof covering. On the other hand, if the supports are adjusted too low, the aforementioned collision of the tension bow with parts of the automobile body could occur. In addition, both supports on both sides of the automobile body must be adjusted to allow compensation of possible height misalignment between the sides of the vehicle due to production tolerances.

To be sure, readjustment of the supports in the bodyshell before installation of the roof is possible to the extent that it compensates bodyshell manufacturing tolerances. However, since the roof to be installed also has tolerances, but correct folding must nevertheless be ensured, fine adjustment of the supports is possible only after the roof has been installed. Due to the space conditions in the automobile body, this is laborious and time-consuming.

SUMMARY OF THE INVENTION

The objective of the invention is to optimize the installation of the roof of a convertible vehicle with a rear tension bow.

The invention achieves this objective with a convertible vehicle with a convertible vehicle of the type described above, wherein the one or more supports are held one or more arms connected with a roof frame, wherein the roof frame supports the roof covering from below, before the roof frame is mounted on the automobile body. The vehicle roof has at least one arm directed towards the rear area and is assigned to a roof frame that supports the roof covering from below, wherein one or more supports are for supporting the tension bow are arranged independently of a vehicle body that supports the roof after it has been installed.

The invention makes it possible to compensate roof manufacturing tolerances even before the roof is installed in the bodyshell of the automobile body. In this regard, the supports are more readily accessible than in the automobile body after the roof has been placed on it. In addition, the know-how of the roof manufacturer can be utilized for the fine adjustment, and the roof can then be delivered as a finished module for bodyshell installation with the supports already in a properly adjusted state.

In this regard, installation of the roof requires only that the roof module be mounted in the area of lateral main bearings. Alignment on any other body parts, say, in the bottom of the folding-top compartment, is completely unnecessary. Additional supports on the automobile body are also no longer necessary. The installation is thus considerably faster and simpler, and the exactness of the roof folding is improved even when there are large manufacturing tolerances in the bodyshell body.

Further advantages of the invention are explained below with reference to the specific embodiment of the object of the invention that is schematically illustrated in the drawings.

The convertible vehicle 1 of the invention can be both a two-seater and a convertible vehicle with a larger interior and with, e.g., two rows of seats one behind the other.

It has a movable roof 2, which has a flexible roof covering 3 at least in its rear area. In the illustrated embodiment, the roof covering 3 extends over the entire movable roof.

The roof covering 3 can also include a rear window 4 that is flexible and thus foldable itself. The rear window 4 can also be rigid and can be made, for example, of plastic or glass.

Figure 1:
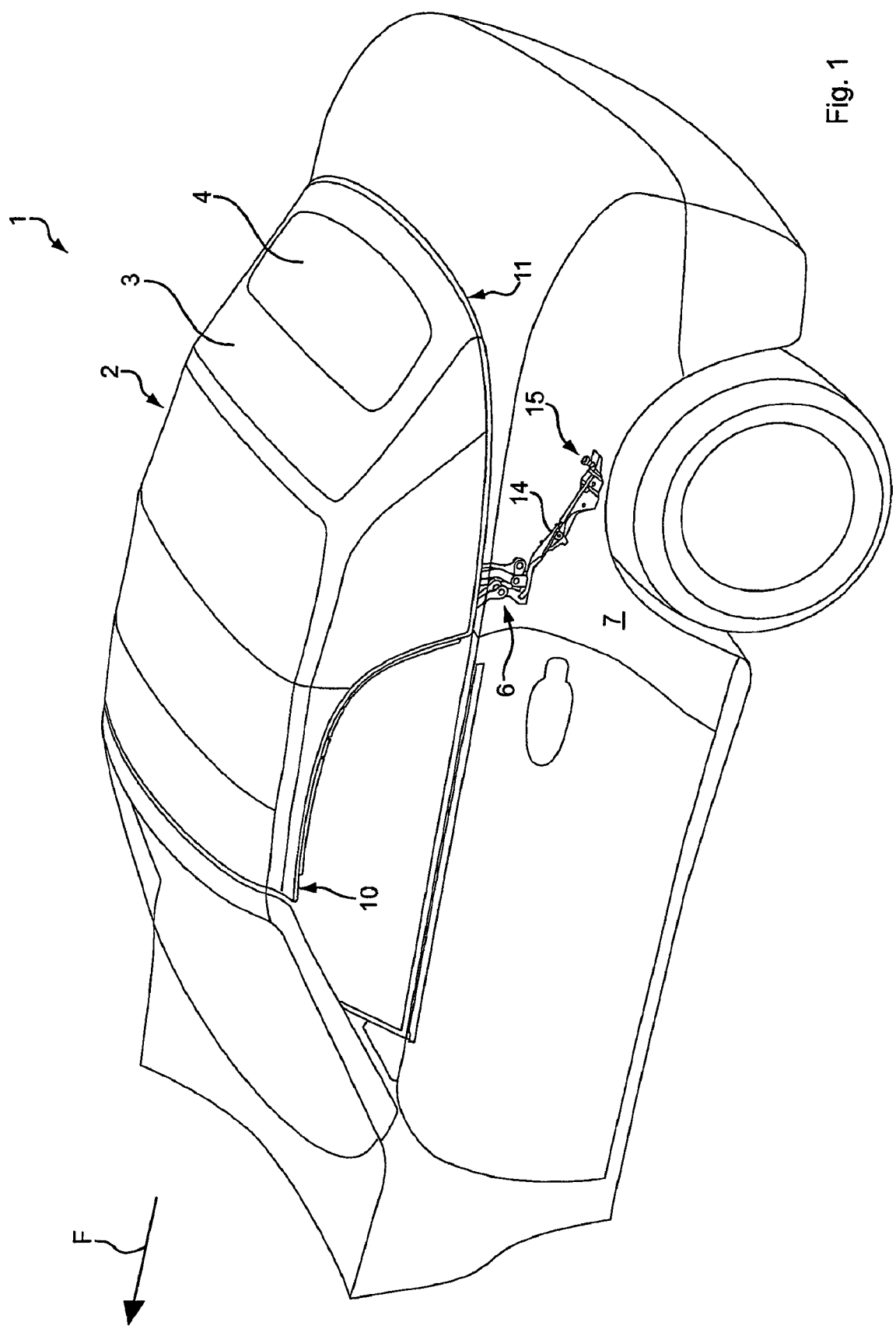
FIG. 1 shows a middle region of a convertible vehicle of the invention in a schematic, partially cutaway perspective view with the roof completely closed.

The roof covering 3 is held from below by a roof linkage, which is labeled as a whole by reference number 5. The roof linkage 5 is mounted on the bodyshell of the automobile body 7 by two lateral main bearings 6. In its closed state, the roof 2 then assumes the position shown in FIG. 1. The joint axes of the main bearings 6 lie horizontally and transversely to the vehicle 1, so that the roof 2 can be swung away to the rear. Instead of a pure rotational movement, translational and rotational movements can be superimposed in a wide variety of ways.

The roof linkage 5 comprises here several bows 8, 9 that support the roof covering 3 from below and run transversely to the roof 2, an inherently rigid roof tip 10 that runs parallel to the bows 8, 9, and a rear tension bow 11, which is essentially U-shaped when viewed from above and comprises a transversely extending center bar 12 and lateral legs 13 that run essentially lengthwise relative to the vehicle 1 in their mounted state. Instead of the one continuous rear tension bow 11, it is also possible to provide individual lateral tension bows, which, for example, can extend towards the rear as fins that taper to an acute angle.

Furthermore, arms 14, which are rigidly connected with the rigid parts of the roof linkage 5, extend to the rear and downward from the main bearings 6 of the roof linkage 5 in the same vertical planes in which the lateral legs 13 of the tension bow 11 lie. To achieve weight savings, they can consist of a light metal material, including, for example, a metallic foam material.

Figure 4:
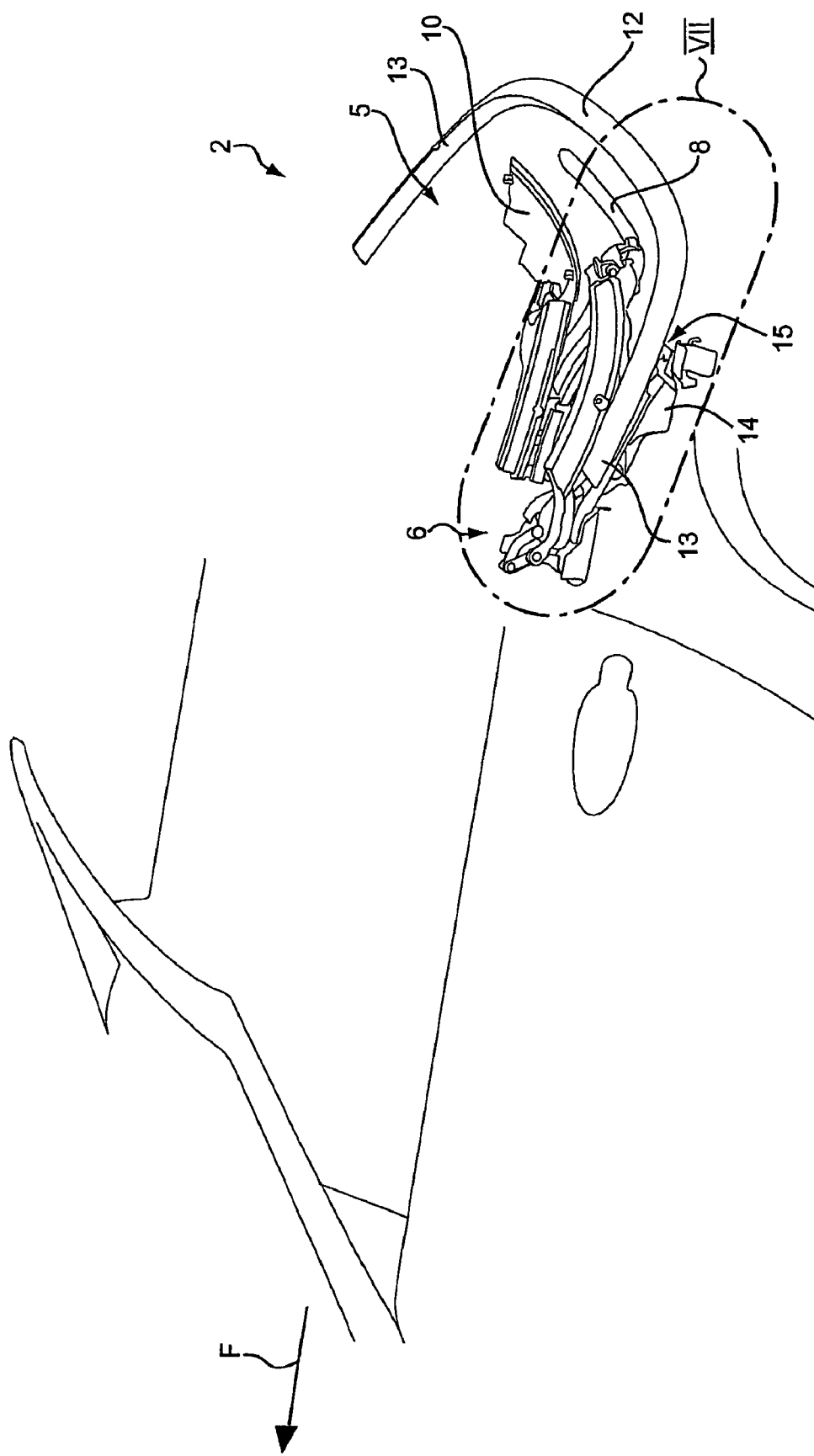
FIG. 4 shows a view similar to that of FIG. 3 with the roof in its completely open position and with the tension bow resting on lateral supports.
Figure 5:
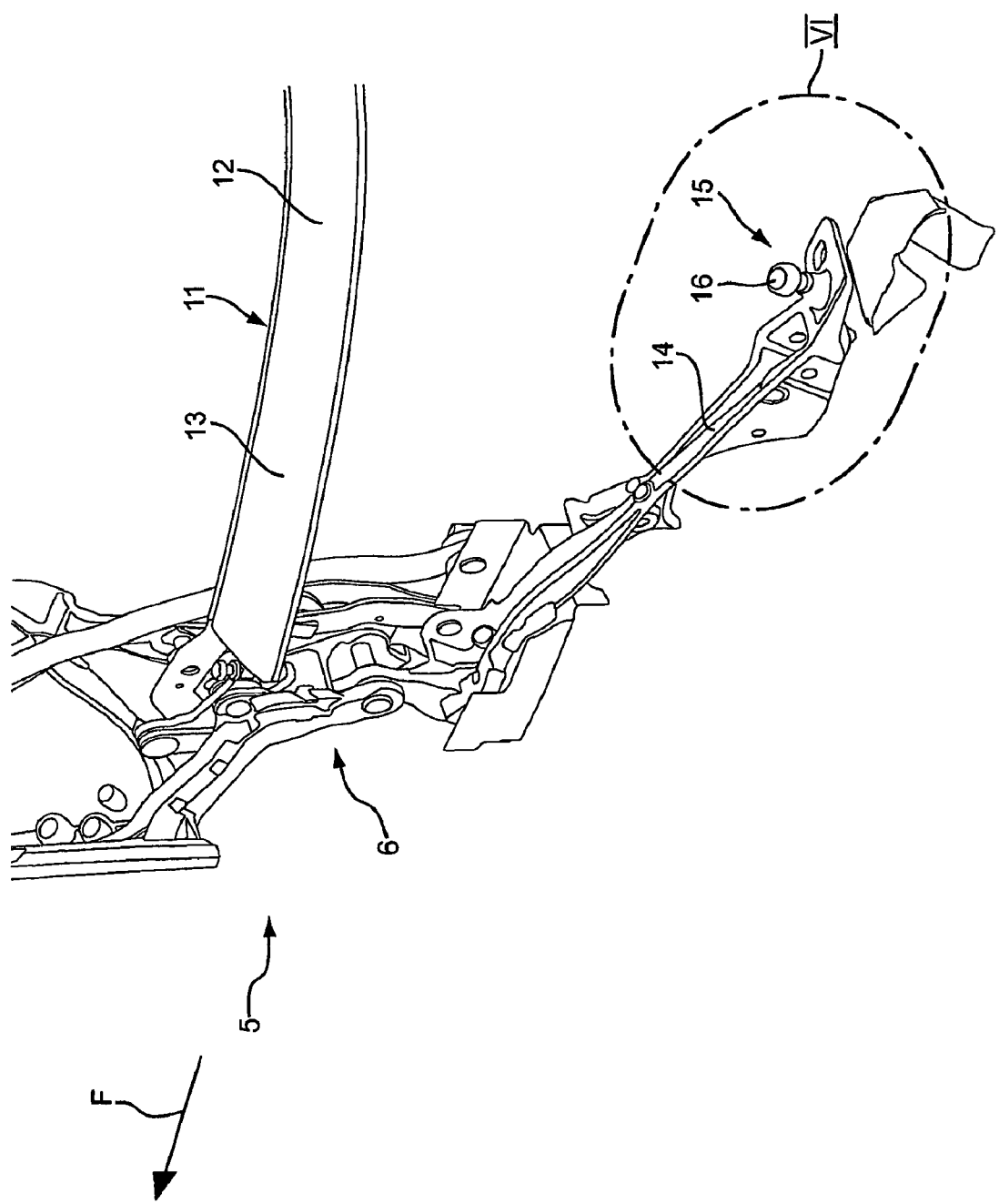
FIG. 5 shows a detail view, corresponding approximately to sector V in FIG. 3, again without the roof covering.
Figure 7:
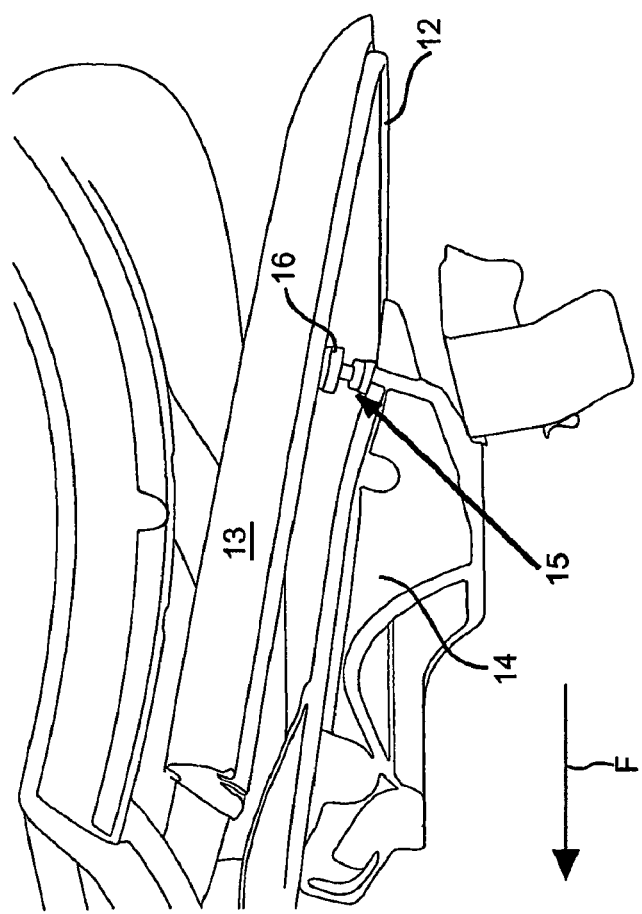
FIG. 7 shows a detail view, corresponding approximately to sector VII in FIG. 4 from a slightly rotated perspective.
Figure 6:
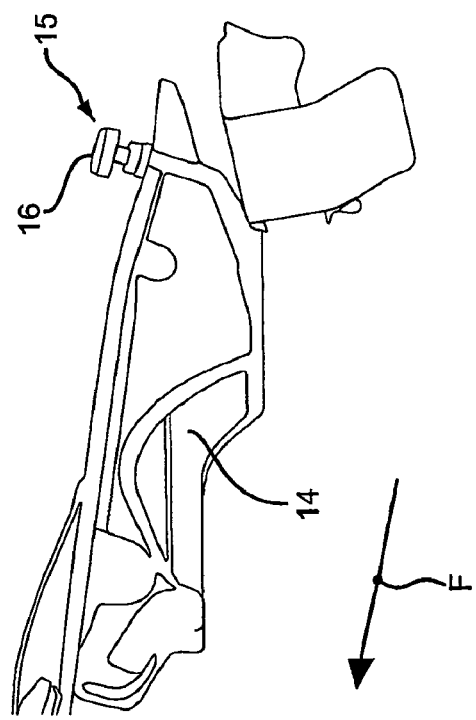
FIG. 6 shows the detail VI in FIG. 5 from a slightly rotated perspective.

At their free ends away from the direction of vehicle travel F, these arms 14 are each provided with a support 15, on which the tension bow 11 rests when the roof 2 is open (FIG. 4, FIG. 7). Since the arms 14 are part of the roof linkage 5, this supported position can be achieved independently of the automobile body 7, e.g., before installation of the roof 2 on the body.

On their upper side, the supports 15 have an elastically deformable cushioning part 16, which can be elastically supported relative to the arm 14 and can be adjusted at least in height. A longitudinal or transverse adjustment of the supports 15 is also possible, as is an adjustment of their inclination.

Before it is installed in the bodyshell, the roof 2 can thus be preassembled on its main bearings 6, e.g., on a stand, so that it can be opened there, and in the process the tension bow 11 drops down. During this process, the supports 15 can be adjusted. In contrast to the prior art, it is not necessary to work from above in a bodyshell, but rather the supports 15 are now freely accessible in the mechanic's field of vision. Fine adjustment of the supports 15 to compensate manufacturing tolerances in the roof 2 can thus be made quickly and easily. The folding of the roof covering 3 can thus be adjusted with the desired sufficiently large bend radii without any special problems.

The modular unit, which has been finally adjusted in this way, can then be delivered to the bodyshell and merely joined with the bodyshell by the opposite main bearings 6 without any necessity of additional work for proper alignment of the roof. The lowered position is always correctly adjusted by preadjustment of the support cushions 15, regardless of whether, for example, in the bodyshell, the bottom of the folding-top compartment was mounted correctly relative to the rear wall or somewhat too high or too low. The arms 14 hang freely behind in the automobile body and have no connection with the body 7 beyond the main bearings 6. Therefore, the arms 14 do not require any further adjustment work, either.

Despite the possibility of adjustment of the supports 15 on the roof module 2 before its installation, the supports 15 can also be adjusted after installation in the automobile body 7, so that, for example, after a damaged roof covering 3 has been replaced, precisely aligned support of the tension bow 11 is once again possible.

Instead of the two separate arms 14 illustrated here, depending on the availability of space, a single, possibly U-shaped arm is also possible, which holds the tension bow 11 from below and supports it when the roof 2 is in the open position.

In the installed state, the roof covering 3 of the closed roof 2 is tensioned by the roof tip 10, the bows 8, 9, and the rear tension bow 11.

Figure 2:
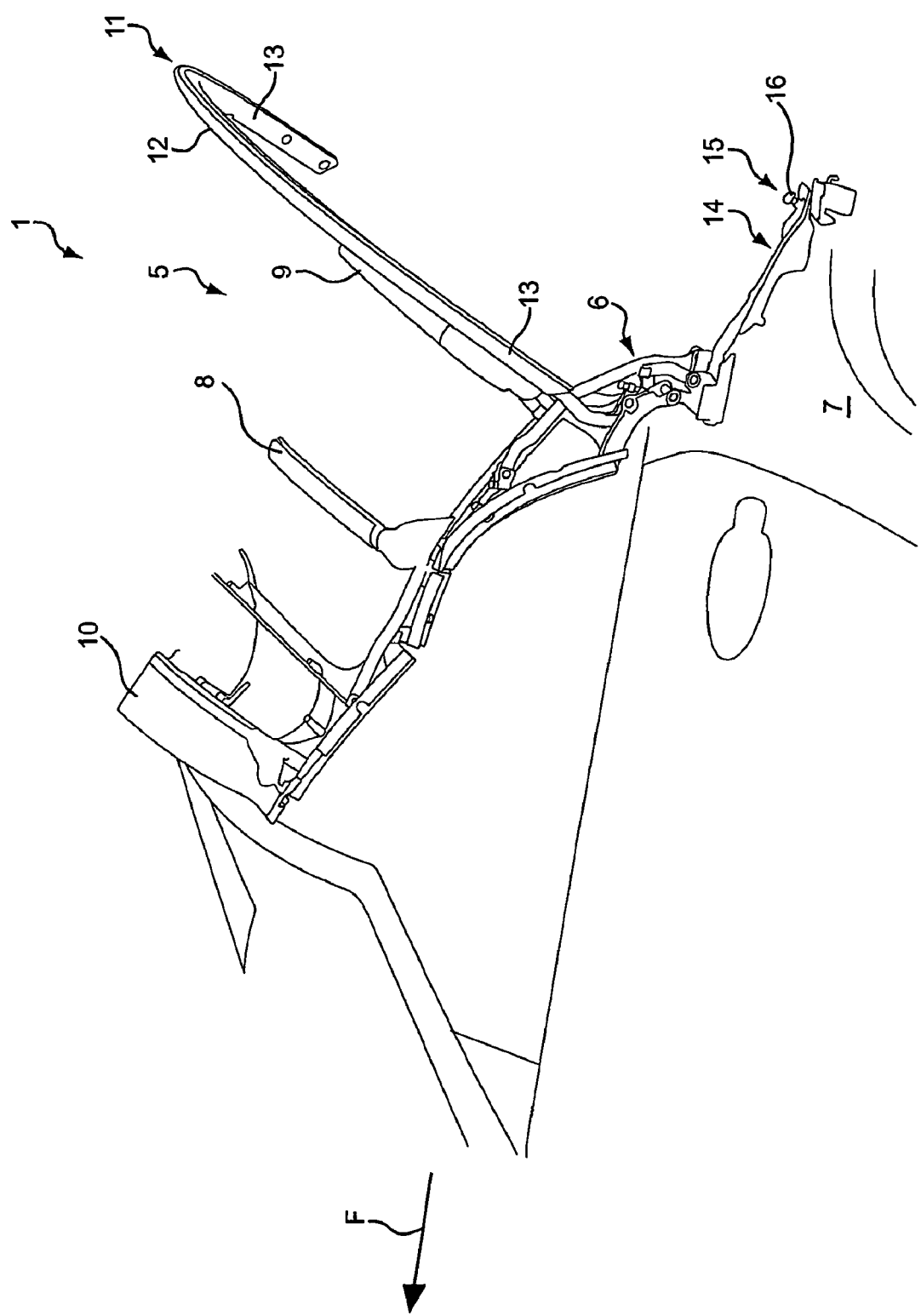
FIG. 2 shows a view similar to that of FIG. 1 as the roof is starting to open, shown without the roof covering for the sake of clarity.
Figure 3:
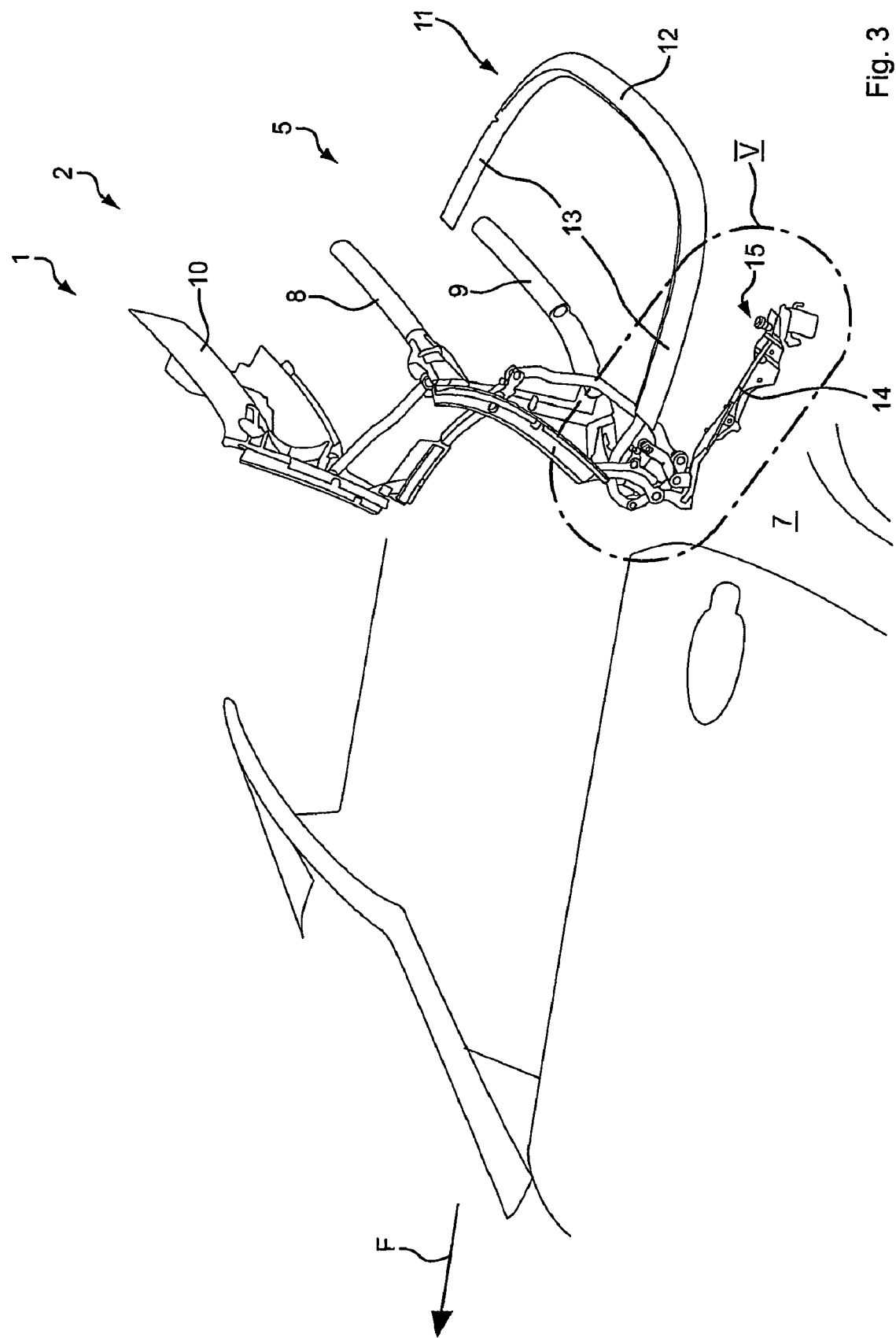
FIG. 3 shows a view similar to that of FIG. 2 with further progression of the opening of the roof and with the tension bow dropping below its plane of extension with the roof closed.

To open the roof, the tension bow 11 is raised from its support position on a section of the automobile body, e.g., the cover of a folding-top compartment (FIG. 2), and the roof tip 10 is detached from the windshield frame. As the opening of the roof progresses, the rear section of the tension bow 11 opposite the direction of vehicle travel F then drops into the automobile body 7 and, at the end of its opening movement, lands from above on the supports 15. The tension bow is then held there without relative movement and without danger of collision with other parts. Therefore, the invention reduces wear of the tension bow 11 and especially wear of the roof covering 3 and of possible body parts that could collide with parts of the roof 2.

The invention can be used both in vehicles with a roof 2 that is manually moved and in vehicles with a roof 2 that can be moved fully automatically or semiautomatically.

The invention claimed is:

1. A convertible vehicle (1) with a roof (2) that has a flexible roof covering (3) at least in its rear area, wherein the roof covering is movable between an open position and closed state, wherein, in the closed state, the roof covering (3) can be held under tension relative to the automobile body (7) by at least one tension bow (11), and wherein, in the open position, the tension bow (11) rests on one or more support(s) (15), wherein the one or more support(s) (15) are held on one or more arms (14), which are connected with a roof frame (5), which supports the roof covering (3) from below, before the roof frame (5) is mounted on the automobile body (7).

2. The convertible vehicle (1) in accordance with claim 1, wherein the tension bow (11) is essentially U-shaped as viewed from above, and the one or more arm(s) include a rearward extending arm (14) on each side of the vehicle, each rearward extending arm being provided with at least one of the one or more support(s) (15) for supporting the underside of the tension bow (11).

3. The convertible vehicle (1) in accordance with claim 1, wherein the one or more arms (14) are made of a light metal material.

4. The convertible vehicle (1) in accordance with claim 1, wherein a vertical extension of the supports (15) on the one or more arm(s) (14) can be individually adjusted.

5. The convertible vehicle (1) in accordance with claim 4, wherein the vertical adjustment can be undertaken before the installation of the roof (2) on the automobile body (7).

6. The convertible vehicle (1) in accordance claim 4, wherein a height adjustment can be undertaken in the installed position of the roof (2).

7. The convertible vehicle (1) in accordance with claim 1, wherein the one or more support(s) (15) can be pressed in like a cushion by the tension bow (11).

8. The convertible vehicle (1) in accordance with claim 1, wherein the one or more support(s) (15) are elastically supported on the one or more arm(s) (14).

9. A movable vehicle roof (2) with a flexible roof covering (3) at least in its rear area, wherein the roof covering is movable between an open position and closed state, wherein, in the closed state, the roof covering (3) can be held under tension by at least one tension bow (11), which, to adjust the roof (2) to its open position, can be displaced downward at least in certain regions below the plane of extension it occupies when the roof is closed, wherein at least one arm (14) that is directed towards the rear area is assigned to a roof frame (5) that supports the roof covering (2) from below, on which arm (14) one or more support(s) (15) for supporting the tension bow (11) in its lowered position are arranged independently of a vehicle body (7) that supports the roof (2) after it has been installed.

* * * * *